United States Patent [19]

Soffer

[11] 4,018,004

[45] Apr. 19, 1977

[54] HUMIDIFYING PLANT TABLE

[76] Inventor: Anita Soffer, 14968 Dickens St., Sherman Oaks, Calif. 91403

[22] Filed: Dec. 24, 1975

[21] Appl. No.: 644,081

[52] U.S. Cl. .................................... 47/39; 261/91
[51] Int. Cl.² ................ A47G 7/00; B01D 47/16; F24F 3/14
[58] Field of Search ............... 47/39, 18; 261/91; 239/219, 221, 214.11

[56] References Cited

UNITED STATES PATENTS

| 307,966 | 11/1884 | Lienhop | 47/39 X |
| 606,842 | 7/1898 | Miller | 47/39 X |
| 1,835,559 | 12/1931 | Cutler | 261/91 |
| 2,159,024 | 5/1939 | Hersperger | 261/91 X |
| 3,229,450 | 1/1966 | Stern | 261/91 X |
| 3,283,478 | 11/1966 | Katzman et al. | 261/91 X |
| 3,290,021 | 12/1966 | Blachly et al. | 261/91 X |
| 3,321,196 | 5/1967 | Weatherston et al. | 261/91 X |

Primary Examiner—Robert E. Bagwill
Attorney, Agent, or Firm—Jack C. Munro

[57] ABSTRACT

A humidifying plant table which is composed of a housing having an internal liquid receiving chamber therein, within the top surface of the housing is located a plurality of spaced apart openings, a mist producing device in the preferred form of a electrically driven motor is attached to the housing and extends within the confines of the internal chamber, the mist producing device extracts liquid from the tank and expels the liquid in the form of a fine droplet mist which, in turn, is expelled into the ambient through the openings provided within the top surface and thereby in contact with any plants which are placed upon the top surface.

3 Claims, 3 Drawing Figures

HUMIDIFYING PLANT TABLE

BACKGROUND OF THE INVENTION

Most plants are known to be healthier in a humid atmosphere. A wide variety of plants are kept within houses and buildings. Within most houses and buildings, the atmosphere is controlled and is normally maintained at a low level of humidity. Most indoor plants do not prosper in this type of environment.

Merely watering the plant does not in and of itself satisfy the plant's need for moisture. The leaves and stems of the plant should also receive moisture.

A common way to apply moisture to the leaves and stems of the plant is by the use of a container which employs a push-button spraying device which sprays water in fine droplet form when it is pushed. However, the application of the moisture is an individual application requiring that a person spray each and every plant. Although the use of an individual spray mist bottle is an improvement over applying no moisture at all to the leaves and stems of the plants, it still would be a significant improvement if the plant could be subjected to a humidified atmosphere for an extended period of time.

SUMMARY OF THE INVENTION

The subject matter of this invention is believed to be summarily described in the Abstract Of The Disclosure and reference is to be had thereto.

The primary objective of the structure of this invention is that the plants can be placed in the area of the humidifying atmosphere and remain in that humidifying atmosphere as long as is desired.

A further objective of this invention is that the plants will be healthy in appearance and a pleasure to be observed.

A further objective of this invention is that there is no fear of water droplets coming into contact with a table or other resting surface that may damage that surface since the entire table of this invention is designed to be damage free from water.

DETAILED DESCRIPTION OF THE SHOWN EMBODIMENT

Figure 1:
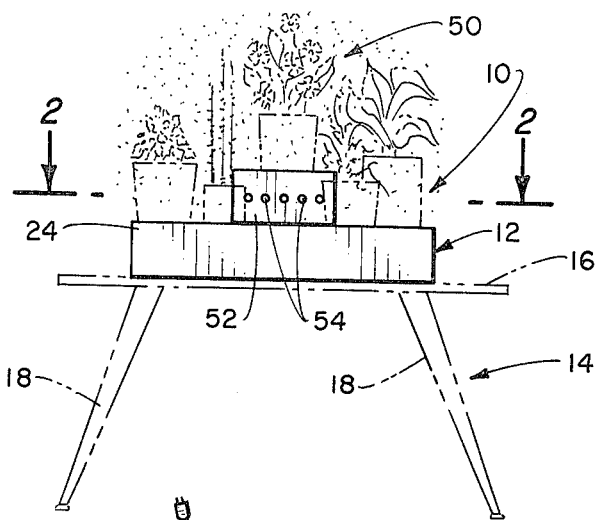
FIG. 1 is a side elevational view of the table of this invention showing how such is to be employed in conjunction with a plurality of plants.
Figure 2:
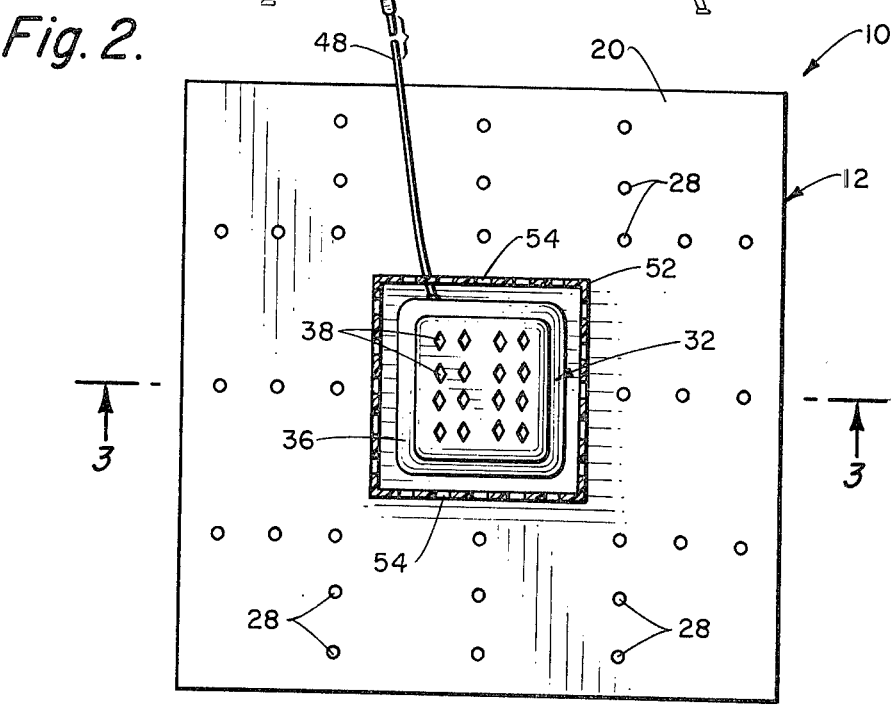
FIG. 2 is a partly in cross-section plan view of the table of this invention taken along line 2—2 of FIG. 1.
Figure 3:
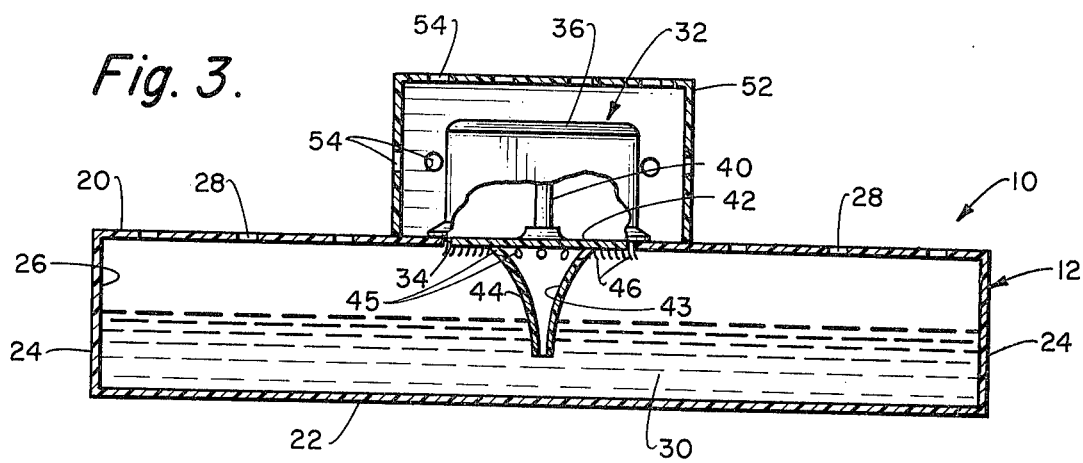
FIG. 3 is a cross-sectional view of this invention taken along line 3—3 of FIG. 2.

Referring particularly to the drawing, there is shown the humidifying plant table 10 of this invention which is composed primarily of a housing 12 which is mounted upon a conventional table 14 shown in phantom in FIG. 1 of the drawing. The conventional table 14 includes a base 16 to which are secured a plurality of legs 18. The device 10 of this invention can be in the form as shown in the drawing of a separate housing 12 which is to be placed upon different supporting surfaces, such as a conventional table 14 or can be constructed in the form of a unitary table device in which the table 14 would be constructed integral with the housing 12.

The housing 12 is formed basically of a rectangular or square shape but can be any other convenient shape. The housing 12 includes a top 20 and a bottom 22 which are interconnected by side walls 24. Located within the housing 12 is an internal chamber 26. Formed within the top 20 is a plurality of openings 28. The openings 28 are placed at any desired points in the top 20 and are actually spaced apart in such a manner so that when plants are placed upon the top 20, that the base of the plants will not normally obstruct any of the openings 28.

Located within the internal chamber 26 is to be a quantity of liquid 30 which is normally water. In normal operation, the internal chamber 26 will be only approximately half filled with water 30.

Centrally mounted upon the top 20 is a mist producing device 32. A portion of the mist producing device 32 extends through an enlarged opening 34 formed within the top 20. The mist producing device 32 includes an electrically driven motor (not shown) which is mounted within a motor housing 36. The upper surface of the motor housing 36 includes a plurality of air receiving openings 38 which is adapted to permit air to pass therethrough to cool the motor and also for air to be conducted into the chamber 26. The motor shaft 40 is connected to rotate disc-shaped impeller 42. Centrally mounted upon the impeller 42 is a tube 44. This tube 44 extends below the upper level of the liquid 30. There is an internal opening 43 within tube 44. Adjacent the lower surface of impeller 42 formed within tube 44 are a plurality of openings 45 annularly arranged about tube 44. Attached to the motor housing 36 and extending about the periphery of the impeller 42 is a circular row of brush bristles 46.

In order to operate the mist producing means 32, electrical power is supplied through the electrical conduit 48 to operate the motor which, in turn, rotates the impeller 42. The impeller 42 causes air to be moved through the openings 38 and expelled into the space above the level of the liquid 30 located within the internal chamber 26. By the rotation of impeller 42 and tubee 44, water is caused to move by capillary action up both the inner and outer surface of tube 44. The water than contacts the lower surface of impeller 42 with the portion of the water within tube 44 passing through openings 45. The water then moves by centrifugal force across the lower surface of impeller 42 and is then discharged into chamber 26 in the form of small droplets. The water is distributed in a very fine droplet form which intermixes with the air. This combination air and water mixture then strikes the row of brushes 46 which further causes the water to be further distributed into a more finely droplet form. The result is that a mist is produced which is distributed within the air space of the internal chamber 26 and is then conducted into the ambient through the openings 28. Plants 50 are to be placed upon the top 20 with these plants being subjected to the humidifying mist being conducted through the openings 28.

For appearance purposes, the mist producing device 32 is covered by cover 52. The cover 52 is integrally secured to the housing 12. Within the cover 52 are located a plurality of openings 54 which are to permit air to be passed through the cover 52 and thereupon through the openings 38.

What is claimed is:

1. A humidifying plant table comprising:
    a housing having first opening means therein, an internal chamber located within said housing, said opening means providing access into said internal chamber, said housing having a top surface and a bottom surface interconnected by sidewalls, said first opening means being located within said top surface with plants being adapted to rest upon said top surface, said first opening means comprises a substantial number of separate openings of equal size;

a quantity of liquid adapted to be located within said internal chamber but not filling said internal chamber so as to leave a space above the level of the liquid, said first opening means communicating with said space; and mist producing means connected to said housing and including a liquid supply tube extending to below the level of liquid within said internal chamber, said mist producing means additionally comprising means to rotate said tube and cause the water picked up by said tube to be formed into fine mist droplets, whereby upon activation of said mist producing means said fine mist droplets are conducted into the proximity of any plants which are placed upon said top surface of said housing, said mist producing means further comprising an electric motor centrally mounted upon said top surface, a cover attached to said housing and located about said motor, said cover including a plurality of second openings therein in order to provide access of air to said motor, said second openings being physically located substantially above the plane of said top surface of said housing; and a motor housing closely surrounding said motor and located within said cover, said motor housing having third openings therein to provide access of air directly into said motor.

2. The humidifying plant table as defined in claim 1 wherein:

said liquid supply tube has an internal opening with liquid being adapted to move by capillary action up both the exterior surface and interior surface of said tube, said means to rotate said tube and produce said droplets comprising a flat disc impeller having an upper surface and a lower surface, said motor connected to said upper surface of said impeller, said tube fixedly connected to said lower surface of said impeller, fourth opening means extending through the wall of said tube to conduct the water from within said internal opening to said exterior surface and hence upon said lower surface of said impeller, the water driven by said tube to be deposited on the surface of said impeller; and dispersing means arranged about the periphery of said impeller to produce said droplets.

3. The humidifying plant table as defined in claim 2 wherein:

said dispersing means comprises a row of brush bristles.

* * * * *